W. TURNER & F. STALLA.
PLUMBER'S SANITARY TEST PLUG.
APPLICATION FILED JAN. 13, 1909.
922,544.
Patented May 25, 1909.
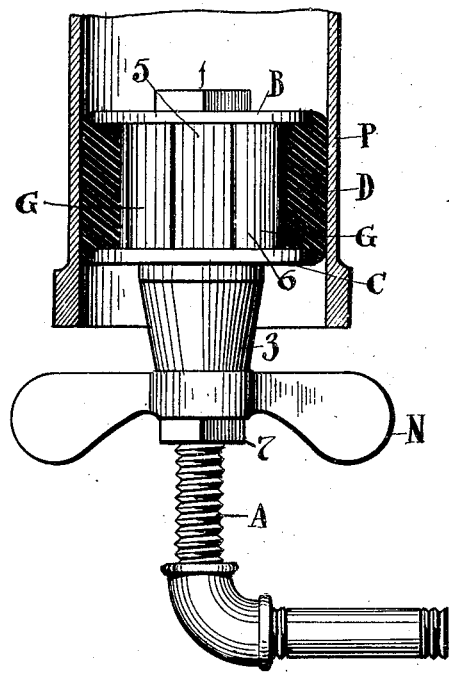
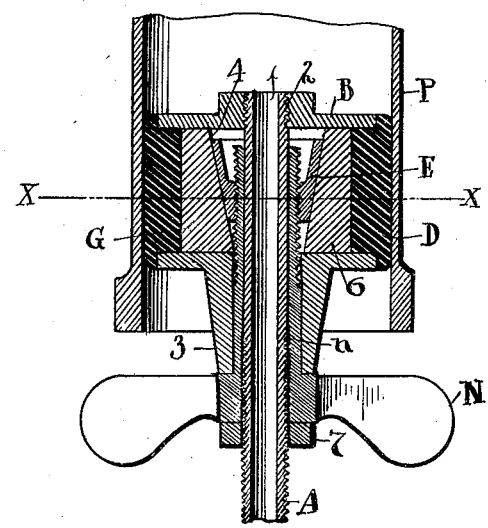
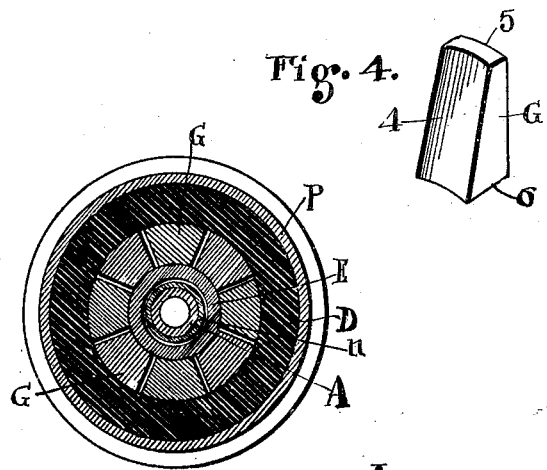
ATTEST
E. M. Fisher.
F. C. Musson.
INVENTORS
Walter Turner.
Frederick Stalla.
BY Fisher & Moser, ATTYS.

UNITED STATES PATENT OFFICE.

WALTER TURNER AND FREDERICK STALLA, OF ELYRIA, OHIO.

PLUMBER'S SANITARY TEST-PLUG.

No. 922,544.  Specification of Letters Patent.  Patented May 25, 1909.

Application filed January 13, 1909. Serial No. 472,017.

*To all whom it may concern:*

Be it known that we, WALTER TURNER and FREDERICK STALLA, citizens of the United States, residing at Elyria, in the county of Lorain and State of Ohio, have invented certain new and useful Improvements in Plumbers' Sanitary Test-Plugs, of which the following is a specification.

Our invention relates to a plumber's sanitary test plug, and the invention consists in the construction and combination of parts, substantially as shown and described and particularly pointed out in the claims.

In the accompanying drawings, Figure 1 is a side elevation of the plug, and a sectional elevation of the test pipe connections, and Fig. 2 is a sectional elevation of the plug. Fig. 3 is a cross section of the plug on line $x$—$x$, Fig. 2, and Fig. 4 is a perspective detail of one of the wedge shaped expansion members.

The invention as thus shown consists in sundry parts constructed and arranged to give a maximum expansion to the plug, considering the size of the respective parts, and to produce a grip or hold of such firmness in the drain pipe that it cannot be blown out by the high pressure tests to which it is subjected and hence does not require artificial or other means to secure it in place.

To these several ends the plug comprises a central pipe A, threaded externally at both ends and carrying the disk shaped head B removably secured onto its outer threaded end 2, and the head C oppositely, which has a tapered outwardly extending tubular neck 3 for a purpose to be presently seen and which head C otherwise has the same purpose and function as head B, the plug being laterally expansible under compression between these parts.

D represents a rubber or other flexible ring of band shape by which the plug is directly engaged in drain pipe P, in connection with which the tests are made, and this engagement is effected through the expanding mechanism within the plug and comprises the threaded pipe A, the said disks B and C mounted thereon as above described, the cone shaped nut E, and the split or divided expanding member composed of substantially wedge shaped portions G, of which there are eight in this instance. These lie lengthwise between disks B and C in a circle next within the rubber or like engaging ring D and bear against the same uniformly all around to obtain the expanding pressure and closure required in pipe P. Said parts G are therefore segmental in cross section. Expansion is effected through hollow bolt N having a tubular body $n$ and which is rotatably engaged over or upon pipe A and threaded at its inner end where it is engaged by cone shaped nut E. Said nut is internally threaded to engage upon and be tightened by said bolt, so that when the bolt is turned it will carry the nut in one direction or the other, to tighten or loosen the expanding parts E and G according to the direction of rotation. The said nut E has free travel axially between the two disks or heads B and C, and bears against the inner inclined surfaces 4 of the spreading members G. That is, the outer transversely rounded surfaces 5 of said members G are parallel to the axis of the plug and the inner surfaces 4 are inclined to said axis, and the larger ends 6 come opposite the smaller end of nut E. Hence when the nut is tightened through the turning of the bolt the spreader segments or wedges G are expanded in parallel lines uniformly all around and engaging and sealing ring D is spread or expanded correspondingly. The said bolt N bears against the outer end of sleeve 3 on head C, while the so-called lock-nut 7 on pipe A next outside of bolt N holds the head B in fixed relation to head C and the other parts. Said nut 7 is therefore both a confining nut for adjusting bolt N, or a lock nut therefor, and also a medium for holding the heads B and C together substantially as shown.

By these means we can so forcibly and effectually expand the plug in drain pipe P, or the usual hub in said pipe, that it will not only stand the usual test of say two hundred and fifty pounds pressure, but a much greater pressure without blowing out, and no wiring or other extra means are required to hold it in place.

What we claim is:

1. In a plumber's sanitary test plug, an outer flexible band shaped ring, a series of expanding members arranged about the inside of said ring, a hollow bolt and a conical nut thereon within said expanding members adapted to spread said parts, and heads between which said parts are confined.

2. A plumber's test plug having substantially disk shaped heads and one of said heads provided with an outwardly extending tubular neck, a pipe extending through said neck and disks and threaded in the outer disk, in combination with an outer flexible band shaped engaging ring, a spreader for said ring consisting of a series of substantially wedge shaped members, and a cone shaped nut and a bolt sleeved over said pipe and engaged by said nut and adapted to spread said members and tighten said ring in engaging position.

3. A plumber's test plug comprising a central cone shaped nut, a spreader consisting of a series of wedge shaped members arranged in a circle and engaged on their inner sides by said nut, a flexible band about said spreader and a tubular bolt having a threaded end engaging said cone shaped nut and adapted to expand said parts, in combination with opposite heads within the edges of which said band is seated and adapted to be compressed, and a pipe through said heads upon which said expansion nut and bolt are sleeved, said bolt having a head and hand grip bearing directly against one of said heads.

In testimony whereof we affix our signatures in presence of two witnesses.

WALTER TURNER.
FREDERICK STALLA.

Witnesses:
 Mrs. F. Stalla,
 Theresa O'Hern.